US009871482B2

(12) United States Patent
Ishikawa et al.

(10) Patent No.: US 9,871,482 B2
(45) Date of Patent: Jan. 16, 2018

(54) POWER CONVERSION DEVICE

(71) Applicant: Mitsubishi Electric Corporation, Chiyoda-ku (JP)

(72) Inventors: Shuta Ishikawa, Chiyoda-ku (JP); Masanori Kato, Chiyoda-ku (JP); Shotaro Marumoto, Chiyoda-ku (JP); Ryuichi Takezawa, Chiyoda-ku (JP); Shunichi Nishimura, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/310,143

(22) PCT Filed: Jun. 15, 2015

(86) PCT No.: PCT/JP2015/067172
§ 371 (c)(1),
(2) Date: Nov. 10, 2016

(87) PCT Pub. No.: WO2016/017304
PCT Pub. Date: Feb. 4, 2016

(65) Prior Publication Data
US 2017/0264225 A1 Sep. 14, 2017

(30) Foreign Application Priority Data
Jul. 30, 2014 (JP) ................. 2014-154400

(51) Int. Cl.
*H02P 21/00* (2016.01)
*H02P 21/22* (2016.01)
(Continued)

(52) U.S. Cl.
CPC ............... *H02P 21/22* (2016.02); *H02P 6/15* (2016.02); *H02P 21/14* (2013.01)

(58) Field of Classification Search
CPC ....... H02P 21/22; H02P 21/14; H02P 2201/03
(Continued)

(56) References Cited

U.S. PATENT DOCUMENTS 6,229,278 B1* 5/2001 Garces .............. H02M 7/53875
318/801
6,768,284 B2* 7/2004 Lee ....................... H02M 7/797
318/808

(Continued)

FOREIGN PATENT DOCUMENTS

| JP | 2002-238298 A | 8/2002 |
| JP | 2008-5671 A | 1/2008 |
| WO | 2012/060357 A1 | 5/2012 |

OTHER PUBLICATIONS

International Search Report dated Sep. 1, 2015 in PCT/JP2015/067172 filed Jun. 15, 2015.
Japanese Office Action issued Jan. 26, 2016 in Japanese Application 2015-555475 (with partial English translation).

*Primary Examiner* — Bentsu Ro
*Assistant Examiner* — Thai Dinh
(74) *Attorney, Agent, or Firm* — Oblon, McClelland, Maier & Neustadt, L.L.P.

(57) ABSTRACT

A power conversion device includes a high-pass filter for extracting an AC component of voltage Vdc of a DC link section, a multiplier for multiplying output VdcAC of the high-pass filter by a first gain K1 and outputting the result, a multiplier for multiplying output of the multiplier by a second gain K2 and outputting the result as a d-axis voltage correction signal vdcmp*, and a multiplier for multiplying output of the multiplier by a third gain K3 and outputting the result as a q-axis voltage correction signal vqcmp*. The gate signal generation section generates gate signals on the basis of a signal vd1 obtained by adding the d-axis voltage correction signal vdcmp* to a d-axis voltage command value
(Continued)

vd* and a signal vq1 obtained by adding the q-axis voltage correction signal vqcmp* to a q-axis voltage command value vq*.

12 Claims, 17 Drawing Sheets

(51) Int. Cl.
*H02P 6/15* (2016.01)
*H02P 21/14* (2016.01)

(58) Field of Classification Search
USPC .................. 318/400.02, 400.17, 400.26, 722
See application file for complete search history.

(56) References Cited

U.S. PATENT DOCUMENTS

| | | | |
|---|---|---|---|
| 7,135,833 B2* | 11/2006 | DeLange | G01J 1/04 318/727 |
| 8,970,154 B2* | 3/2015 | Ishikawa | H02M 7/53875 318/438 |
| 2002/0141212 A1 | 10/2002 | Ishida et al. | |
| 2008/0007199 A1 | 1/2008 | Kasaoka et al. | |
| 2012/0001587 A1* | 1/2012 | Kono | H02P 21/26 318/801 |
| 2013/0214717 A1 | 8/2013 | Ishikawa et al. | |

* cited by examiner (A)

(B)

(C)

POWER CONVERSION DEVICE

TECHNICAL FIELD

The present invention relates to a power conversion device which is configured by a converter and an inverter with a capacitor provided therebetween and drives an AC motor or the like, and in particular, relates to technique for suppressing occurrence of overvoltage due to an LC resonance phenomenon caused by an inductance component L that an AC power supply has and a capacitor C.

BACKGROUND ART

A main circuit of this type of power conversion device has a converter which converts AC voltage from an AC power supply to DC voltage and supplies the DC voltage to a DC link section including a smoothing capacitor, and an inverter which converts the DC voltage of the DC link section to AC voltage in a variable-voltage variable-frequency manner and supplies the AC voltage to an AC motor which is an AC load. When the power conversion device is connected to the AC power supply, an LC resonance circuit is formed by an inductance component L which the AC power supply has and the capacitor C of the DC link section.

It is known that, when three-phase AC voltage is rectified by a converter having diodes, oscillation having a frequency six times as large as a power supply frequency occurs on the DC output side. Therefore, when the resonance frequency of the LC resonance circuit coincides with the frequency six times as large as the power supply frequency, voltage of the DC link section in the power conversion device greatly oscillates. As a result, a main circuit component might be broken or control for the AC motor might become unstable.

In particular, in the case of using a capacitor having a small capacitance as the smoothing capacitor, there is a high possibility that the LC resonance phenomenon occurs.

In this regard, for example, Patent Document 1 proposes technique for suppressing occurrence of overvoltage due to the resonance phenomenon. That is, Patent Document 1 discloses, in FIG. 15, a method for suppressing oscillation of voltage of the DC link section in a power conversion device that drives a synchronous motor by vector control.

Specifically, voltage of the DC link section is detected, an AC component is extracted from the detected voltage, and a q-axis voltage command is corrected by a signal obtained by multiplying the AC component by a gain K.

Thus, it is allegedly possible to prevent a phenomenon in which voltage of the DC link section greatly oscillates and overvoltage occurs.

CITATION LIST

Patent Document

Patent Document 1: International Publication No. WO2012/060357A1 (paragraphs [0082] to [0085], FIG. 15)

SUMMARY OF THE INVENTION

Problems to be Solved by the Invention

In the case where an AC motor which is an AC load is required to be driven in a wide speed range for use in, for example, various vehicles or the like, if the motor rotates at a high speed, output voltage of an inverter becomes too large due to the speed electromotive force of the motor. As a result, a condition that is severe both in an insulation sense and in a magnetic sense occurs. In order to prevent this, so-called flux-weakening control is used.

In the flux-weakening control, d-axis current is controlled to be minus, thereby output voltage of the inverter is suppressed and voltage saturation is prevented.

However, in the conventional device in Patent Document 1, mainly, only the q-axis voltage command is corrected. In the case where the flux-weakening control in which d-axis current is also applied at the same time is required as described above, the effect of suppressing overvoltage due to resonance is not sufficiently obtained, and as a result, voltage of the DC link section greatly oscillates, so that continuous operation might not be performed.

The present invention has been made to solve the above problem, and an object of the present invention is to obtain a power conversion device capable of reliably preventing occurrence of overvoltage due to the LC resonance phenomenon, without restricting the operation method of the AC motor, that is, in cases including the case of performing flux-weakening control.

Means of Solution to the Problems

A power conversion device according to the present invention includes a converter for converting AC voltage from an AC power supply to DC voltage and supplying the DC voltage to a capacitor; an inverter for converting the DC voltage of the capacitor to AC voltage and supplying the AC voltage to the AC load; a d-axis current controller for generating a d-axis voltage command value so that a deviation between a d-axis current command value and a d-axis current detection value on a d-q two-axis orthogonal coordinate system becomes zero; a q-axis current controller for generating a q-axis voltage command value so that a deviation between a q-axis current command value and a q-axis current detection value on the d-q two-axis orthogonal coordinate system becomes zero; and a gate signal generation section for generating a gate signal for driving the inverter, on the basis of the d-axis voltage command value and the q-axis voltage command value. The power conversion device further includes a voltage detection section for detecting voltage of the capacitor; a filter section for extracting an AC component of the voltage detected by the voltage detection section; a multiplier for multiplying output of the filter section by a first gain and outputting a result thereof; a d-axis voltage compensation section for multiplying output of the multiplier by a second gain and outputting a result thereof as a d-axis voltage correction signal; and a q-axis voltage compensation section for multiplying output of the multiplier by a third gain and outputting a result thereof as a q-axis voltage correction signal. The gate signal generation section generates the gate signal on the basis of a signal obtained by adding the d-axis voltage correction signal to the d-axis voltage command value and a signal obtained by adding the q-axis voltage correction signal to the q-axis voltage command value, thereby occurrence of overvoltage due to an LC resonance phenomenon caused by an inductance component that the AC power supply has and the capacitor is suppressed

Effect of the Invention

In the power conversion device according to the present invention, as described above, an inverter is controlled by gate signals generated on the basis of signals obtained by respectively adding a d-axis voltage correction signal and a q-axis voltage correction signal to a d-axis voltage command value and a q-axis voltage command value. Thus, occurrence of overvoltage due to a LC resonance phenomenon can be reliably suppressed even in the case where, in addition to q-axis current, current is applied also on d axis by flux-weakening control.

EMBODIMENTS FOR CARRYING OUT THE INVENTION

Embodiment 1

Figure 1:
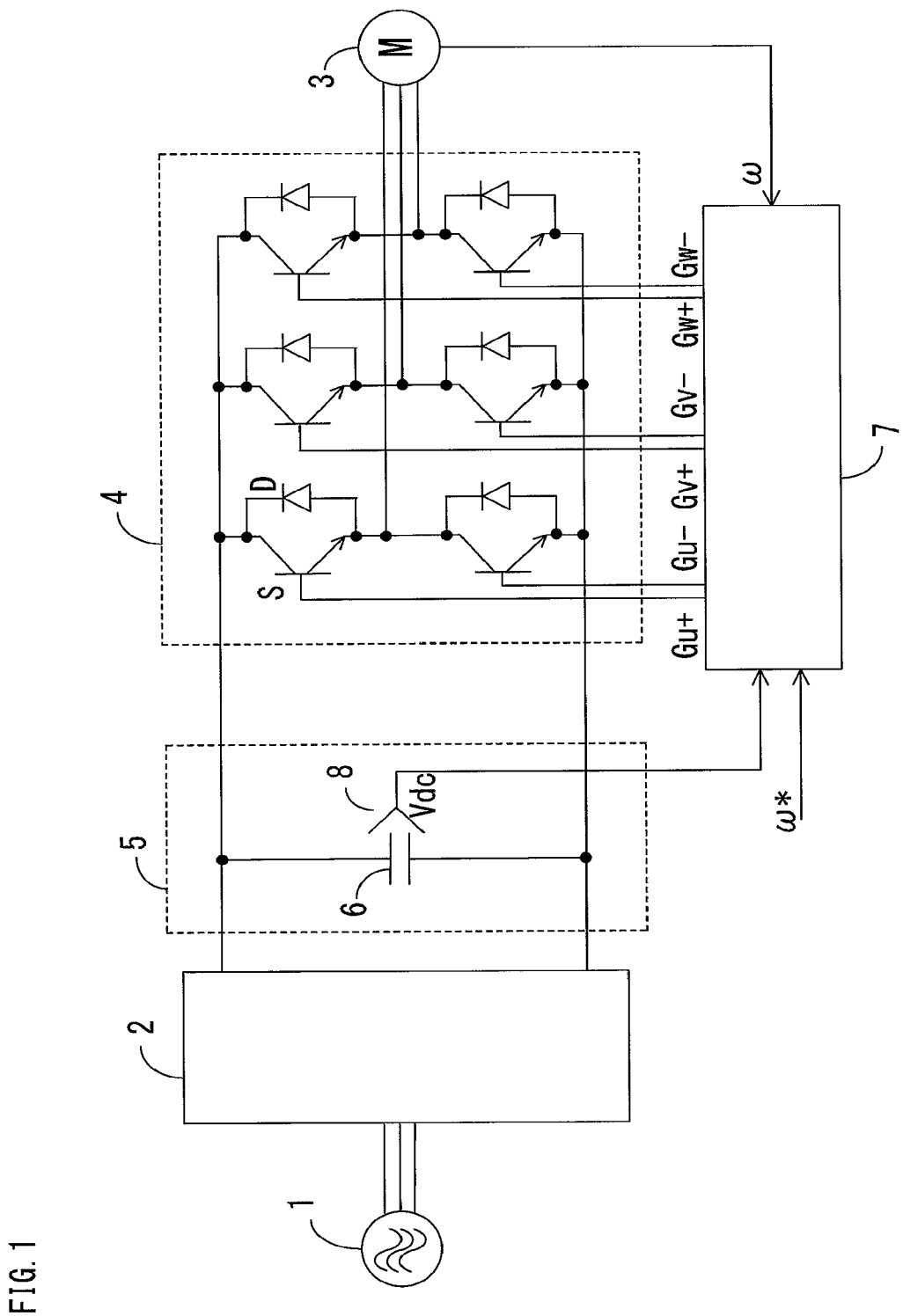
FIG. 1 is a diagram showing the entire configuration of a power conversion device according to embodiment 1 of the present invention.

FIG. 1 is a diagram showing the entire configuration of a power conversion device according to embodiment 1 of the present invention. A main circuit of the power conversion device has a three-phase AC power supply 1, a DC link section 5 including a smoothing capacitor 6, a converter 2, and an inverter 4. The converter 2 converts three-phase AC voltage from the AC power supply 1, to DC voltage, and supplies the DC voltage to the DC link section 5. The inverter 4 converts the DC voltage of the DC link section 5 to AC voltage in a variable-voltage variable-frequency manner and supplies the AC voltage to an AC motor 3 which is an AC load.

Though the inside of the converter 2 is not shown, the converter 2 has, in general, a configuration in which diode elements are connected in a three-phase bridge form, and the inverter 4 has a configuration in which switching elements S and diode elements D connected in antiparallel thereto are connected in a three-phase bridge form.

Although described later in detail, a control unit 7 for performing control receives DC link voltage Vdc of the DC link section 5, i.e., a capacitor 6 detected by a voltage detection section 8, a speed command value ω*, and a speed detection value ω, and generates gate signals Gu+, Gu−, Gv+, Gv−, Gw+, Gw− for performing ON/OFF driving of the respective switching elements S of the inverter 4.

Hereinafter, the internal configuration of the control unit 7 in FIG. 1 will be described on the basis of FIG. 2, and further, the control configuration and operation of the power conversion device according to embodiment 1 of the present invention will be described in detail.

In the present embodiment, a vector control method in which calculation is performed in a d-q two-axis orthogonal coordinate system is used, and schematically, a speed control system executed on q axis, an excitation control system executed on d axis, and a resonance suppression control block 9 which is a major part of the invention of the present application, are provided.

First, in the speed control system, a speed controller 10 generates a q-axis current command value iq* by PI control or the like so that a deviation between a speed command value ω* for the AC motor 3 inputted from a superior control system, and a speed detection value ω inputted from a speed detection section (not shown) becomes zero. A phase angle deriving section 11 integrates the speed detection value ω and thereby outputs a phase angle θe needed for two-phase/three-phase conversion, to a gate signal generation section 17 described later.

A q-axis current controller 10Q generates a q-axis voltage command value vq* by PI control or the like so that a deviation between the q-axis current command value iq* and a q-axis current detection value iq from a current detection section (not shown) becomes zero.

Next, in the excitation control system, a d-axis current command value id* is generated on the basis of a predetermined pattern, including flux-weakening control, by an excitation controller (not shown).

A d-axis current controller 10D generates a d-axis voltage command value vd* by PI control or the like so that a deviation between a d-axis current command value id* and a d-axis current detection value id from a current detection section (not shown) becomes zero.

Next, the resonance suppression control block 9 will be described. A high-pass filter 12 as a filter section outputs an AC component of DC link voltage Vdc detected by the voltage detection section 8. Here, since an LC resonance phenomenon caused by an inductance component L that the AC power supply 1 has and a capacitance C of the capacitor 6 is assumed as described above, the AC component is a resonance component VdcAC having a frequency six times as large as the power supply frequency. A multiplier 13 multiplies the resonance component VdcAC by a predetermined first gain K1 so that the magnitude of a voltage correction signal Vcmp* described later becomes a value appropriate for providing a resonance suppression effect, and outputs a result thereof.

A phase advancing section 14 advances the signal from the multiplier 13 by a predetermined phase, and outputs the resultant signal as the voltage correction signal Vcmp*. In the actual control operation, sampling of data such as current and voltage and calculation using these data are executed per predetermined control cycle, and but naturally, a waste time based on this control cycle arises.

In the present invention, as described later, resonance suppression is performed by adding a voltage correction signal to a voltage command value, and therefore, in order to obtain a proper effect of resonance suppression, the phase advancing section 14 for compensating for the above waste time is needed.

Hereinafter, a specific example of the control cycle and the waste time will be described.

Since a resonance frequency FLC is six times as large as the power supply frequency, for example, in a 60 Hz system, FLC=360 Hz. If time Tc per one control cycle is 250 μs, a phase angle θc in the resonance frequency, corresponding to one control cycle, is represented by expression (1).

$$\theta c = 360 \text{ Hz} \cdot 0.00025 \text{ s} * 360 \text{ deg} = 32.4 \text{ deg} \quad (1)$$

Normally, so-called zero order hold which holds the previous sampling value until this time is used. Therefore, the zero order holding process needs 0.5 times the control cycle, and further the calculation process needs one control cycle. Thus, a waste time that is 1.5 times as large as the control cycle arises in total.

Therefore, the phase advancing section 14 is designed to have a circuit configuration having a transfer function that achieves a phase advance by 32.4×1.5=48.6 deg.

As a matter of course, in the case where a calculation processing device that is capable of high-speed operation and therefore is generally expensive is provided so that the control cycle can be set to such an extremely short time that the waste time is negligible, it is also possible that the phase set in the phase advancing section 14 is made to be zero and therefore, substantially, the phase advancing section 14 is omitted.

Next, a multiplier 15 as a d-axis voltage compensation section and a multiplier 16 as a q-axis voltage compensation section will be described.

First, as a premise, a principle on which resonance oscillation of DC link voltage Vdc is suppressed will be described.

Using d-axis voltage vd, q-axis voltage vq, d-axis current id, and q-axis current iq, output power P of the inverter is represented by expression (2).

[Mathematical 1]

$$P = v_d i_d + v_q i_q \quad (2)$$

If ΔP is defined as variation in power P when vd, vq, id, and iq respectively vary by Δvd, Δvq, Δid, and Δiq, expression (3) is obtained.

[Mathematical 2]

$$\begin{aligned} P + \Delta P &= (v_d + \Delta v_d)(i_d + \Delta i_d) + (v_q + \Delta v_q)(i_q + \Delta i_q) \\ &= v_d i_d + v_d \Delta i_d + \Delta v_d i_d + \Delta V_d \Delta i_d + \\ &\quad v_q i_q + v_q \Delta i_q + \Delta v_q i_q + \Delta v_q \Delta i_q \end{aligned} \quad (3)$$

From expression (2) and expression (3), the variation ΔP in the power is represented by expression (4).

[Mathematical 3]

$$\Delta P = v_d \Delta i_d + \Delta v_d i_d + \Delta v_d \Delta i_d + v_q \Delta i_q + \Delta v_q i_q + \Delta v_q \Delta i_q \quad (4)$$

Regarding three terms at the preceding stage on the right-hand side of expression (4), Δid and Δvd are minute as compared to id and vd, and therefore the term ΔvdΔid is negligible. Similarly, regarding three terms at the subsequent stage, the term ΔvqΔiq is negligible. As a result, the variation ΔP in the power can be simplified as shown by expression (5).

[Mathematical 4]

$$\Delta P = v_d \Delta i_d + \Delta v_d i_d + v_q \Delta i_q + \Delta v_q i_q \quad (5)$$

On the basis of expression (5), the power conversion device according to embodiment 1 of the present invention adjusts Δvd and Δvq, thereby suppresses the variation ΔP in the output power of the inverter, that is, suppresses occurrence of overvoltage due to the LC resonance phenomenon.

In embodiments 3 and 4 described later, Δid and Δiq are adjusted in addition to Δvd and Δvq, and in embodiments 5 and 6 described later, only Δid and Δiq are adjusted.

In order to suppress the resonance, when DC link voltage Vdc oscillates, the following operation is performed to suppress the oscillation.

When DC link voltage Vdc increases, the output power is increased to suppress the increase in DC link voltage Vdc.

That is, the d-axis voltage vd and the q-axis voltage vq are corrected so as to increase.

In addition, when DC link voltage Vdc decreases, the output power is decreased to suppress the decrease in DC link voltage Vdc.

That is, the d-axis voltage vd and the q-axis voltage vq are corrected so as to decrease.

Figure 2:
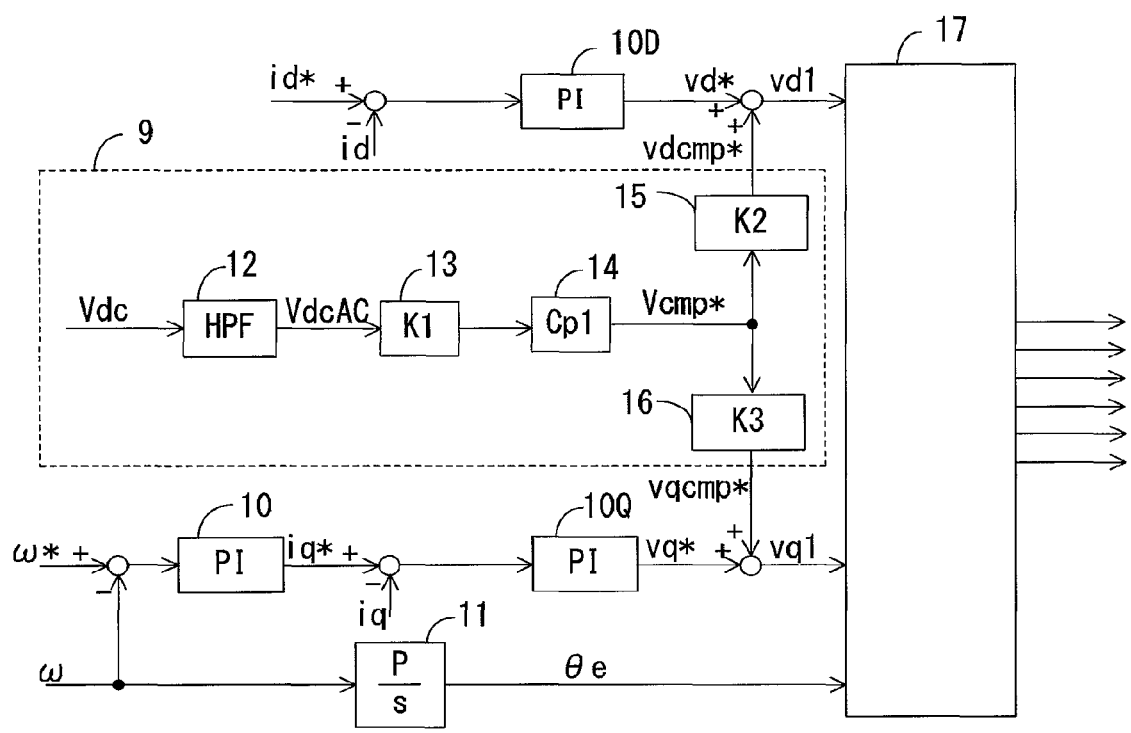
FIG. 2 is a diagram showing the internal configuration of a control unit 7 in FIG. 1.

Therefore, as for the sign of the first gain K1 set in the multiplier 13 described in FIG. 2, it is found that the first gain K1 should be set to a positive value.

As described in expression (5), in the present embodiment 1, in order to correct both the d-axis voltage vd and the q-axis voltage vq, the multiplier 15 as a d-axis voltage compensation section outputs, as a d-axis voltage correction signal vdcmp*, a signal obtained by multiplying the voltage correction signal Vcmp* from the phase advancing section 14 by a second gain K2. Then, a signal vd1 obtained by adding the d-axis voltage correction signal vdcmp* and the d-axis voltage command value vd* from the d-axis current controller 10D is outputted to the gate signal generation section 17.

Similarly, a signal obtained by multiplying the voltage correction signal Vcmp* by a third gain K3 is outputted as a q-axis voltage correction signal vqcmp*. Then, a signal vq1 obtained by adding the q-axis voltage correction signal vqcmp* and the q-axis voltage command value vq* from the q-axis current controller 10Q is outputted to the gate signal generation section 17.

The correction amounts for the d-axis voltage vd and the q-axis voltage vq, that is, the second gain K2 set in the multiplier 15 and the third gain K3 set in the multiplier 16 are respectively calculated by expression (6) and expression (7).

[Mathematical 5]

$$K_2 = \frac{i_d}{\sqrt{i_d^2 + i_q^2}} \quad (6)$$

$$K_3 = \frac{i_q}{\sqrt{i_d^2 + i_q^2}} \quad (7)$$

Here, id is a d-axis current detection value, and iq is a q-axis current detection value. If variations in these detection values are great, the d-axis current command value and the q-axis current command value may be respectively used instead of these detection values.

In order to simplify the setting, K2 and K3 may be set to fixed values, i.e., K2=K3=1/(√2), though the resonance suppression in this case is not necessarily accurate. As a matter of course, when flux-weakening control is not performed, K2 and K3 may be set as K2=0 and K3=1.

Figure 3:
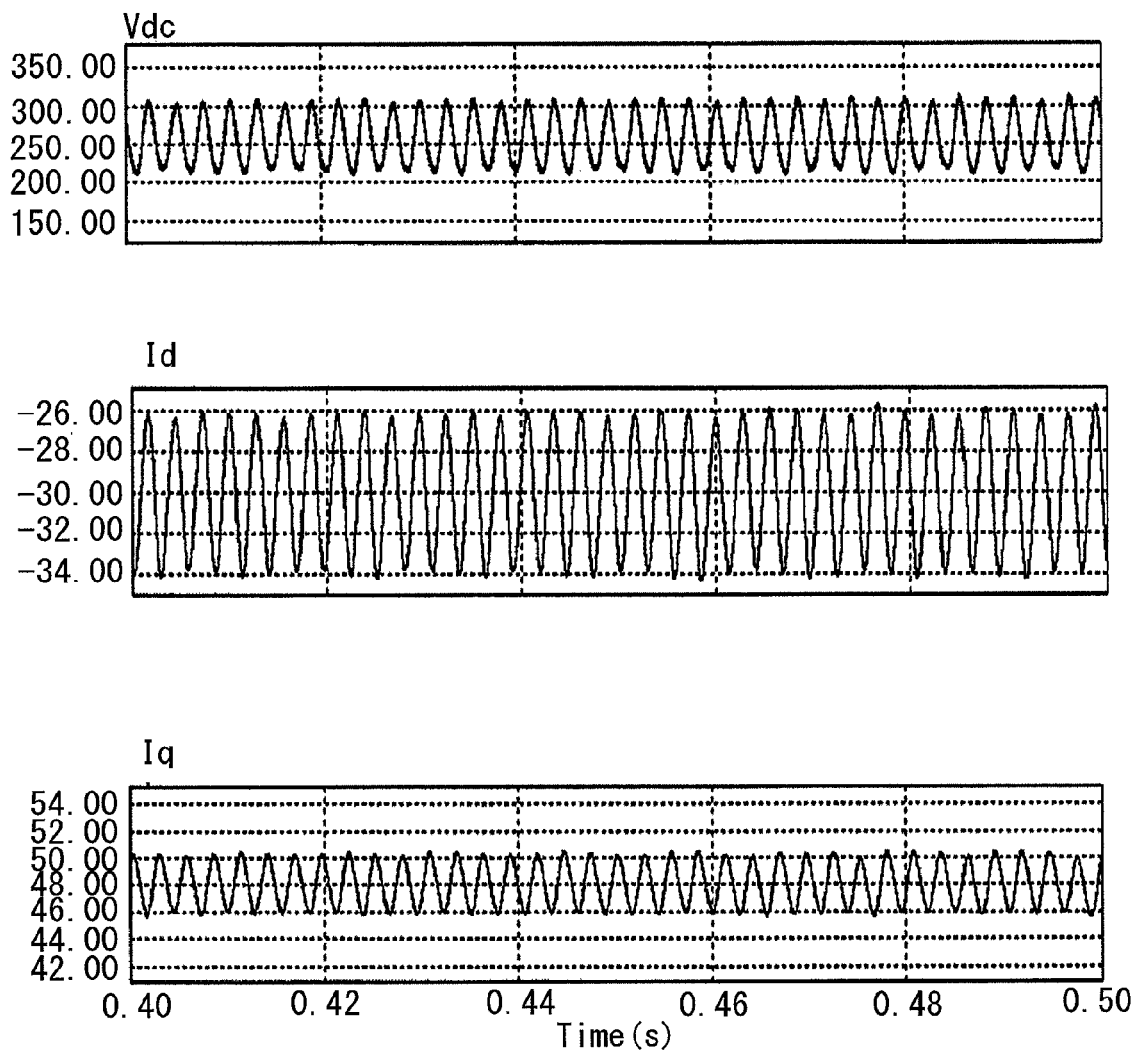
FIG. 3 is a diagram showing DC link voltage Vdc of a DC link section according to embodiment 1 of the present invention.
Figure 4:
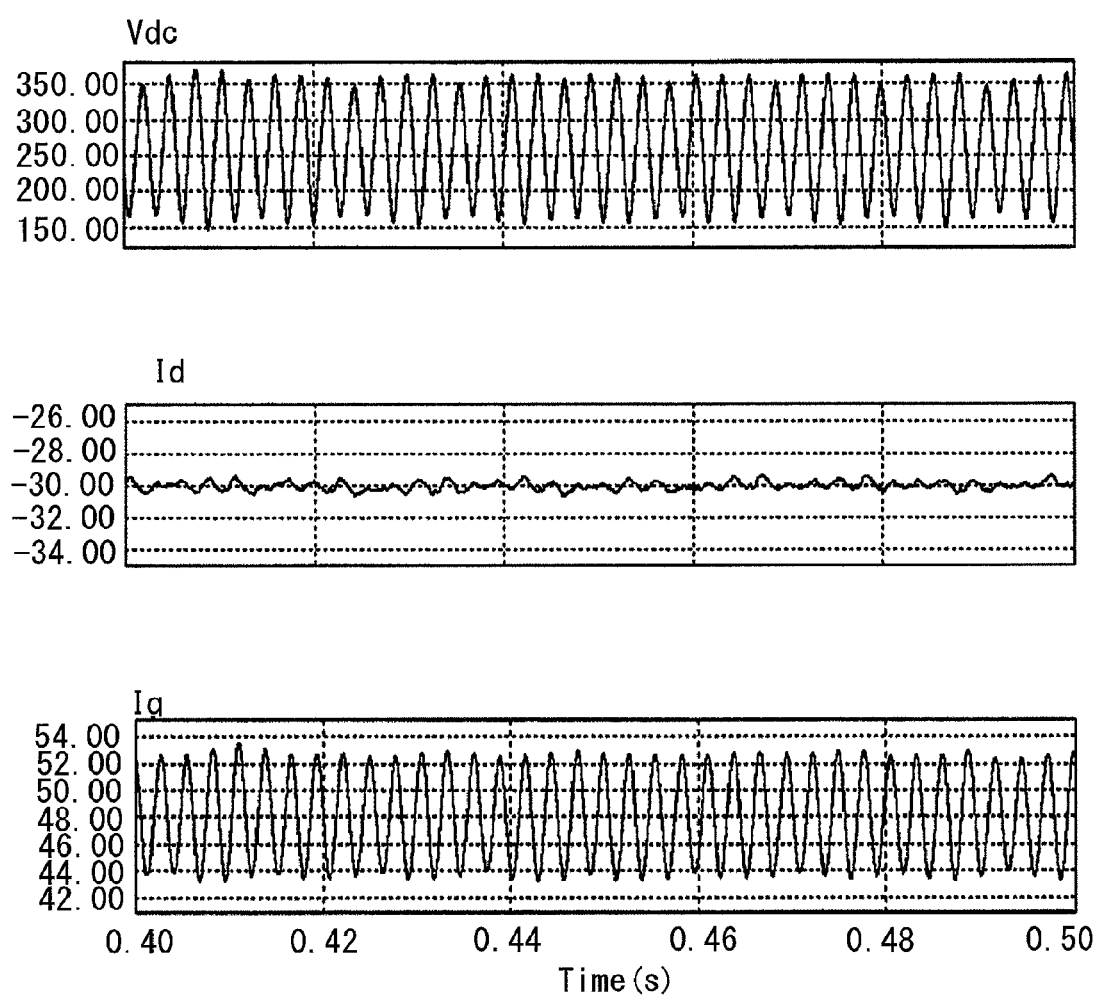
FIG. 4 is a diagram showing DC link voltage Vdc of a DC link section according to a general configuration.

FIG. 3 and FIG. 4 are diagrams showing DC link voltage Vdc of the DC link section 5 obtained by applying the resonance suppression control block 9 described above, compared with the case of general configuration. That is, FIG. 3 shows the case of the present invention, and shows the DC link voltage Vdc at the upper stage, the d-axis current detection value id at the middle stage, and the q-axis current detection value at the lower stage. It is found that, both of the d-axis voltage vd and the q-axis voltage vq are corrected in accordance with the d-axis current id and the q-axis current iq, as a result, the amplitude of oscillation of DC link voltage Vdc is greatly suppressed as compared to the case of FIG. 4 described below.

On the other hand, in FIG. 4, since only the q-axis voltage vq is corrected but the d-axis voltage vd is not corrected, although the d-axis current command value id* (about −30 A) is applied by flux-weakening control, the d-axis current id merely flows as constant current following the command value therefor, and it is found that, as a result, DC link voltage Vdc greatly oscillates.

As described above, in the power conversion device according to embodiment 1 of the present invention, the inverter 4 is controlled on the basis of gate signals obtained from: the signal vd1 obtained by adding the d-axis voltage command value vd* and the d-axis voltage correction signal vdcmp* calculated by multiplying the voltage correction signal Vcmp* by the second gain K2; and the signal vq1 obtained by adding the q-axis voltage command value vq* and the q-axis voltage correction signal vqcmp* calculated by multiplying the voltage correction signal Vcmp* by the third gain K3. Thus, occurrence of overvoltage due to the LC resonance phenomenon can be reliably suppressed even in the case where the motor operation range is expanded and operation in which, in addition to q-axis current, current flows also on d axis by flux-weakening control is performed.

Embodiment 2

Figure 5:
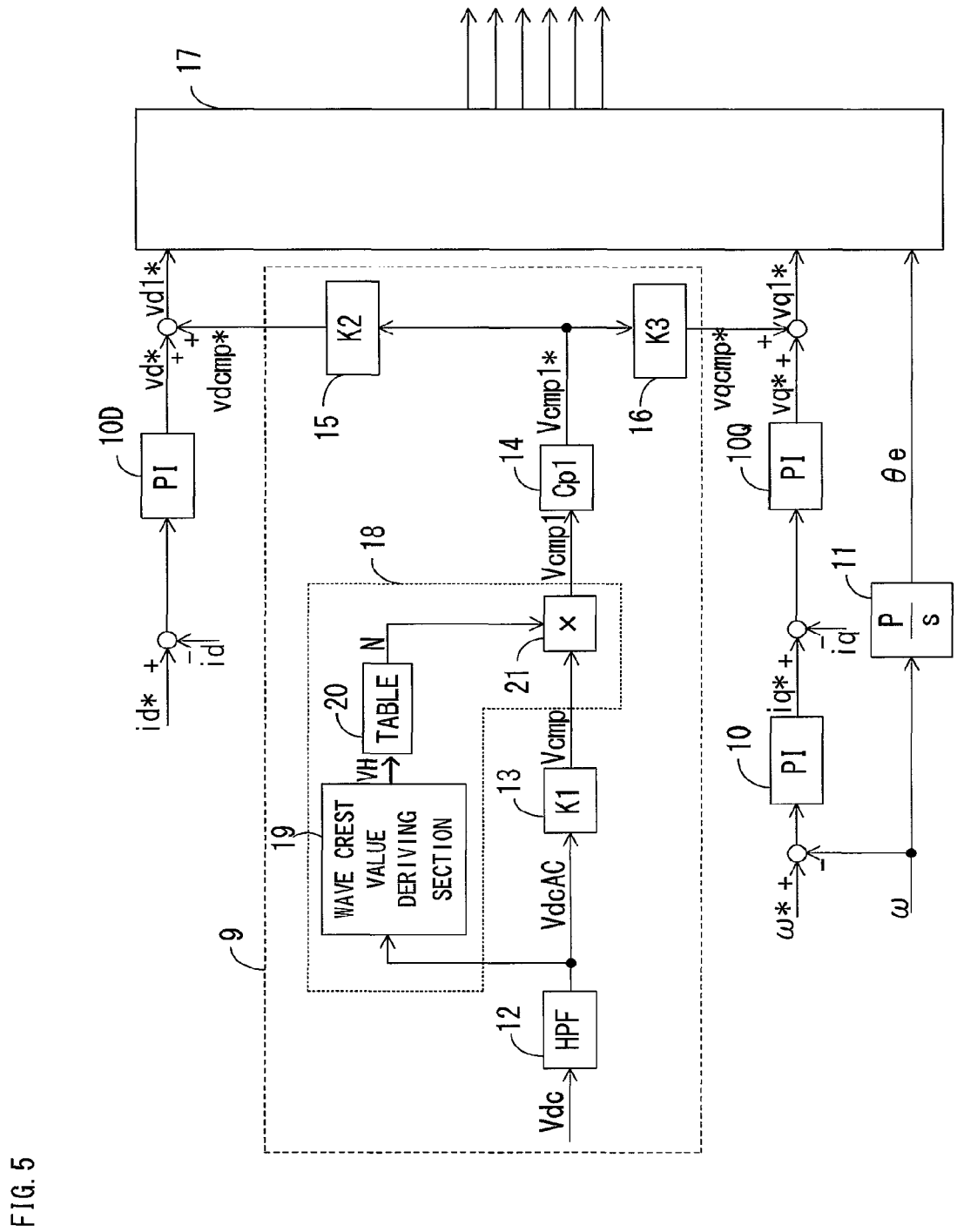
FIG. 5 is a diagram showing the internal configuration of a control unit 7 of a power conversion device according to embodiment 2 of the present invention.

FIG. 5 is a diagram showing the internal configuration of a control unit 7 in a power conversion device according to embodiment 2 of the present invention. A difference from the case of FIG. 2 in embodiment 1 is that a resonance suppression control adjustment section 18 is provided in the resonance suppression control block 9. Hereinafter, the different part will be mainly described.

The condition in which the resonance suppression control is needed is that the resonance frequency of the LC resonance circuit coincides with a frequency six times as large as the power supply frequency, and that the output power of the inverter 4 is great.

Figure 6:
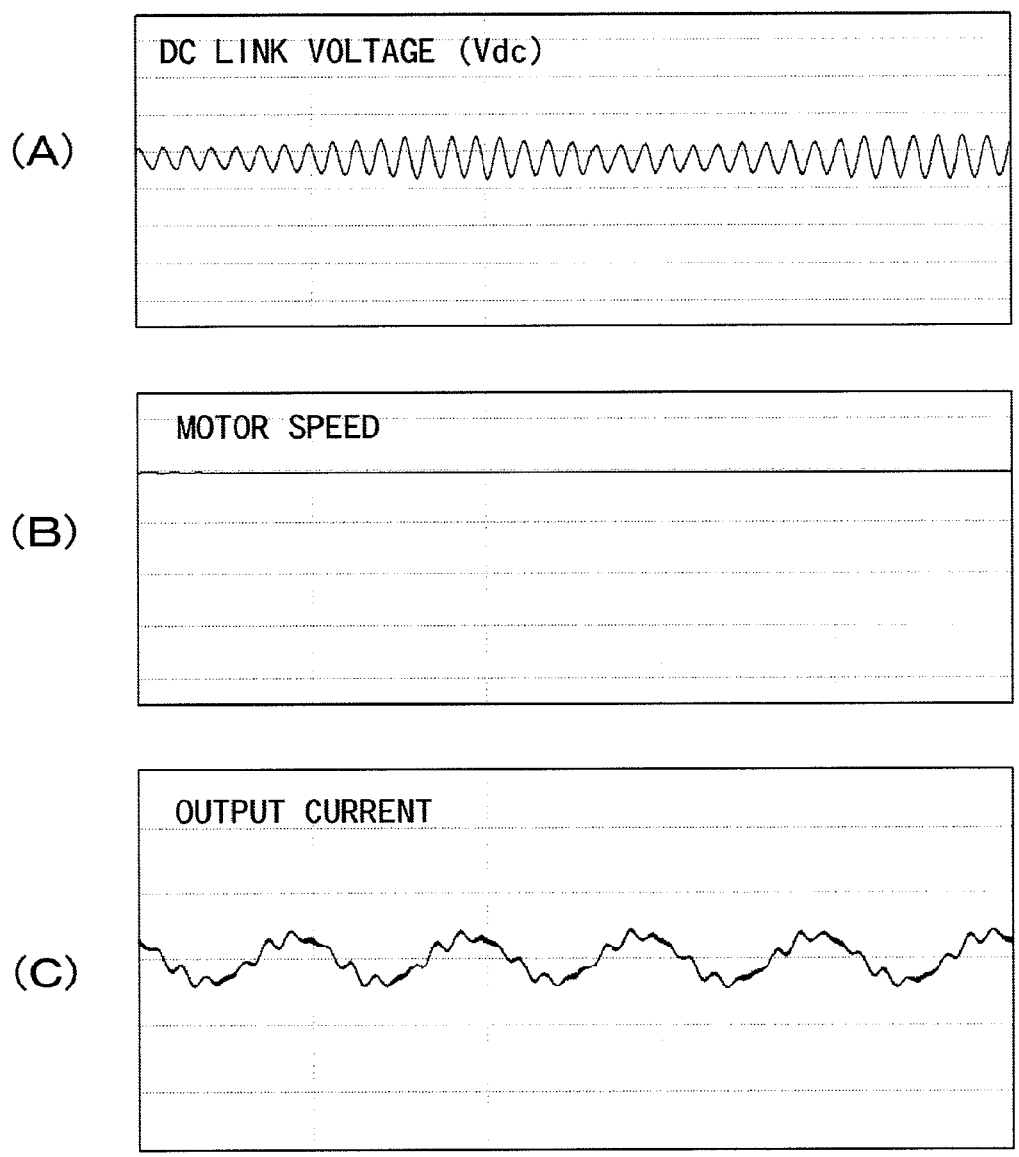
FIG. 6 is a diagram showing the relationship between consumed power in an AC motor 3 and DC link voltage Vdc.
Figure 7:
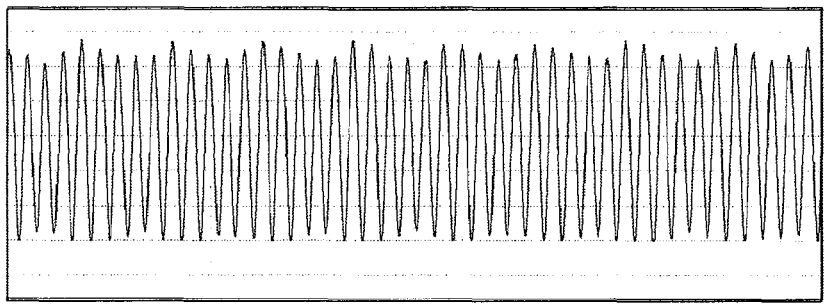
FIG. 7 is a diagram showing the relationship between consumed power in the AC motor 3 and DC link voltage Vdc.
Figure 7:
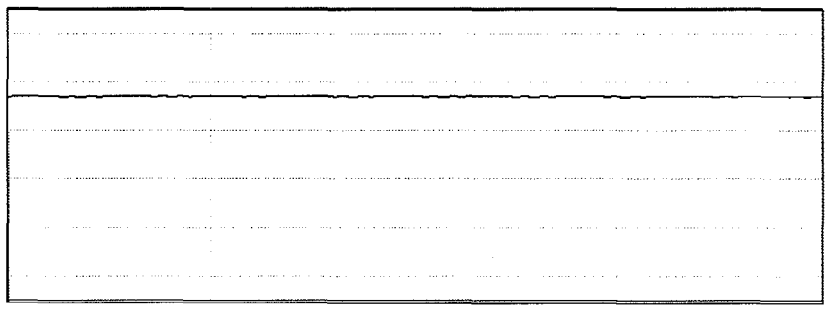
Figure 7:
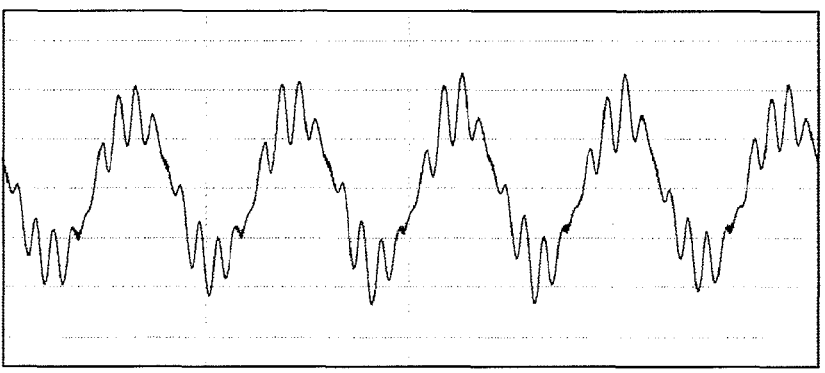

FIG. 6 and FIG. 7 show examples of the relationship between consumed power in the AC motor 3 and oscillation of DC link voltage Vdc in the case where the resonance frequency coincides with a frequency six times as large as the power supply frequency. FIG. 6 shows the case where the consumed power is small, and FIG. 7 shows the case where the consumed power is great, and in each figure, from the upper stage, the DC link voltage Vdc (A), the motor speed (B), and then the output current (C) are shown.

As the consumed power becomes greater, current flowing into the smoothing capacitor 6 becomes greater and oscillation of DC link voltage Vdc increases. On the other hand, in the case where the consumed power in the AC motor 3 becomes smaller, current flowing into the smoothing capacitor 6 becomes smaller, and therefore, even if the resonance frequency coincides with a frequency six times as large as the power supply frequency, oscillation of DC link voltage Vdc decreases. In this case, even if the resonance suppression control is not performed, DC link voltage Vdc does not greatly oscillate.

On the other hand, if the resonance suppression control is performed, energy is exchanged between the AC motor 3 and the capacitor 6. Thus a problem exists in that torque ripple of the AC motor 3 increases.

Accordingly, unlike the above embodiment 1 in which the resonance suppression control is always performed, in the present embodiment 2, the resonance suppression control adjustment section 18 is newly provided in order to adjust the level of the resonance suppression control in accordance with the condition in which overvoltage occurs in DC link voltage Vdc.

This adjustment is performed by the multiplier 21 which multiplies the voltage correction signal Vcmp by an adjustment coefficient N (set in a range of 0 to 1) set in the resonance suppression control adjustment section 18.

That is, although the first gain K1 set in the multiplier 13 is a fixed value in the above embodiment 1, in the present embodiment 2, the first gain K1 is multiplied by the adjustment coefficient N, whereby, substantially, the first gain K1 is changed.

Hereinafter, the method for deriving the adjustment coefficient N will be described.

The wave crest value deriving section 19 receives the resonance component VdcAC of the DC link voltage Vdc and derives an amplitude VH of the resonance voltage VdcAC. The wave crest value deriving section 19 performs operation such as envelope detection, to extract the magnitude of oscillation of the resonance component VdcAC.

It is possible to perform determination as to the necessity of the resonance suppression on the basis of whether the amplitude VH of the resonance component is great or small. As the amplitude VH becomes greater, the resonance suppression becomes more necessary, and therefore the adjustment coefficient N should be increased. As the amplitude VH becomes smaller, the resonance suppression becomes unnecessary, and therefore the adjustment coefficient N should be decreased. Using a table 20, the adjustment coefficient N is determined by the amplitude VH of the resonance component.

The wave crest value deriving section 19 receives the resonance component VdcAC of DC link voltage Vdc, and outputs the amplitude VH thereof on the basis of the following expression (8) and expression (9).

[Mathematical 6]

$$V_H(t)=|V_{dcAC}(t)|$$

Condition (i) $|V_{dcAC}(t)|>|V_{dcAC}(t-1)|$   (8)

$$V_H(t)=|V_{dcAC}(t-1)|+\alpha\{|V_{dcAC}(t)|-|V_{dcAC}(t-1)|\}$$

Condition (ii) $|V_{dcAC}(t)|\leq|V_{dcAC}(t-1)|$   (9)

In the above expressions, t indicates the present value, and t−1 indicates a value before one sample. If the present value of an absolute value |VdcAC| of the resonance component increases as compared to the value before one sample (expression (8) in condition (i)), the present value of |VdcAC| is used as the amplitude VH of the resonance component.

On the other hand, if the present value of the absolute value |VdcAC| of the resonance component decreases as compared to the value before one sample (expression (9) in condition (ii)), the amplitude VH is determined by using a low-pass filter having a coefficient α. The α is set to a decimal close to zero.

As shown in expression (8), by easily making the amplitude VH of the resonance component to increase, when the resonance component sharply increases, the amplitude VH increases in immediate response to the increase in the resonance component. On the other hand, in the case where the resonance component decreases, as shown in expression (9), by delaying following of the amplitude VH, the resonance suppression control is prevented from being sharply switched on and off continuously and repeatedly, whereby operation of the resonance suppression control adjustment is stabilized.

Figure 8:
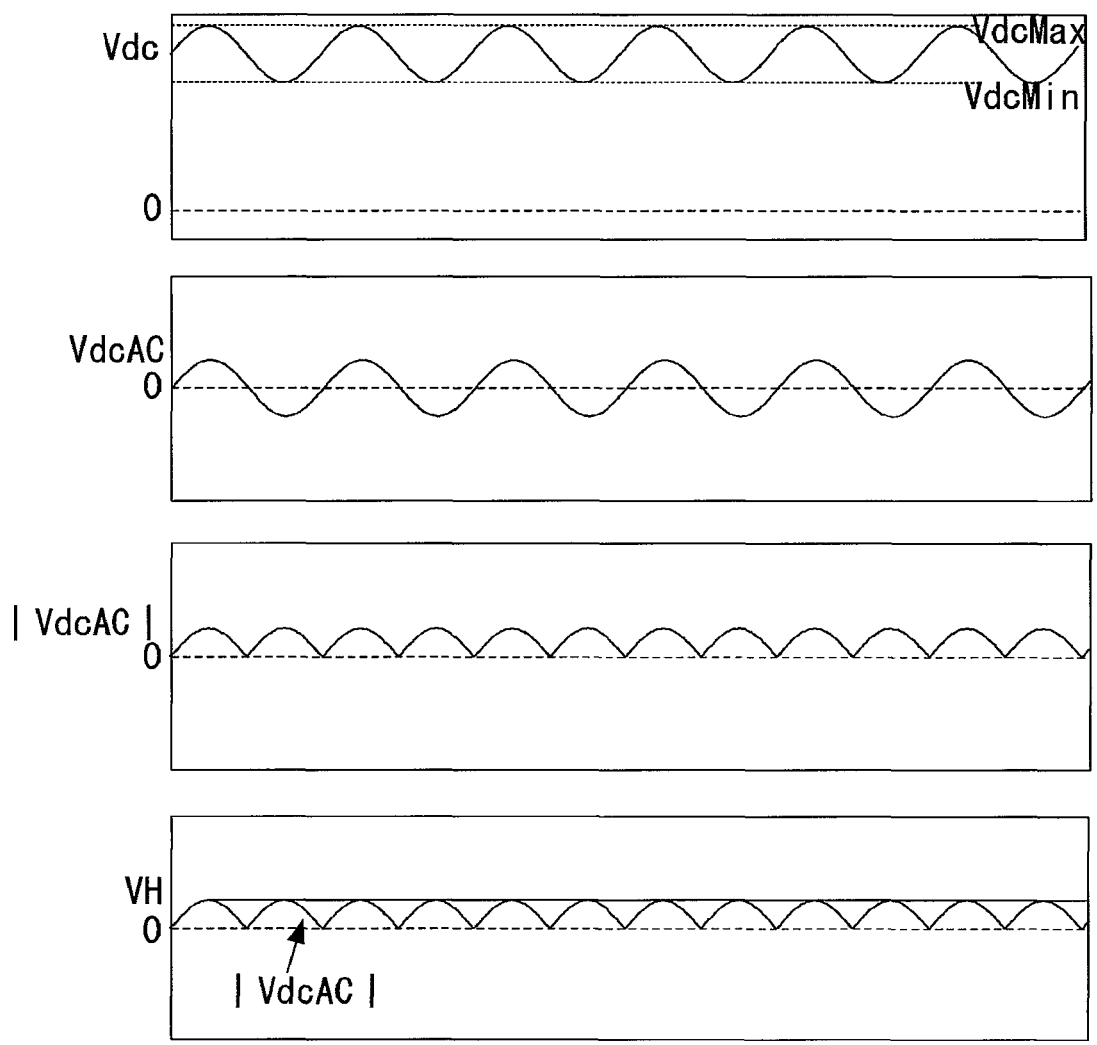
FIG. 8 is a waveform diagram for explaining operation of a wave crest value deriving section 19 in FIG. 5.

FIG. 8 is a diagram for explaining operation of the wave crest value deriving section 19, and shows, from the upper stage, the waveform of the DC link voltage Vdc, the waveform of the resonance component voltage VdcAC, the waveform of the absolute value |VdcAC| thereof, and then the waveform of the amplitude VH of the resonance component. It can be confirmed that the amplitude VH is along the wave crest value of |VdcAC|.

The table 20 receives the amplitude VH and outputs the adjustment coefficient N. As described above, as the amplitude VH increases, the resonance suppression control becomes more necessary, and therefore, the adjustment coefficient N is set so as to become closer to one as the amplitude VH increases. In addition, in order to avoid sharp change in the level of the resonance suppression control, a certain degree of slope is provided.

Figure 9:
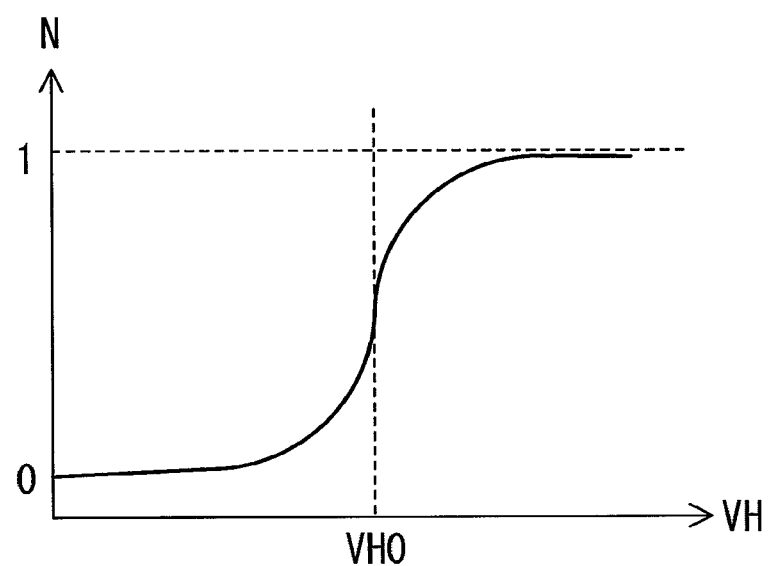
FIG. 9 is a diagram showing input-output characteristics of a table 20 in FIG. 5.

FIG. 9 is an example of the table 20. Here, VH0 is a value as a criterion for ON/OFF of the resonance suppression control. If control is performed using the table 20, the wave crest value of oscillation of DC link voltage Vdc generally becomes a value close to VH0.

As described above, in the power conversion device according to embodiment 2 of the present invention, the wave crest value deriving section 19 calculates the amplitude VH of the resonance component VdcAC of DC link voltage Vdc, and the voltage correction signal Vcmp is adjusted in accordance with the amplitude VH. Thus, occurrence of overvoltage due to the LC resonance phenomenon can be reliably suppressed even in the case where the motor operation range is expanded and flux-weakening control is performed. In addition, increase in motor torque ripple can be minimized by reducing unnecessary resonance suppression control in the case of low load.

Embodiment 3

Figure 10:
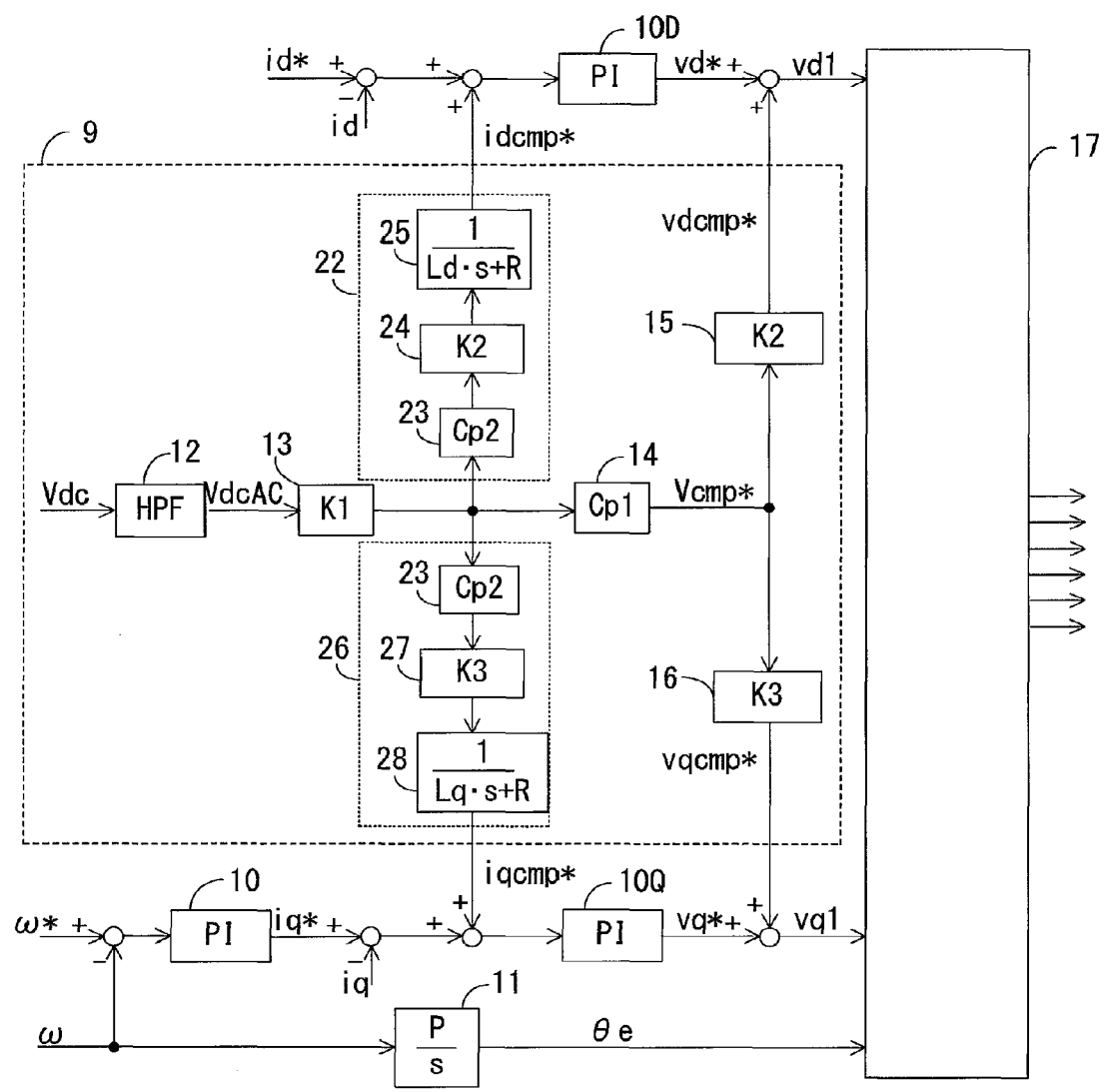
FIG. 10 is a diagram showing the internal configuration of a control unit 7 in a power conversion device according to embodiment 3 of the present invention.

FIG. 10 shows the internal configuration of a control unit 7 in a power conversion device according to embodiment 3 of the present invention. A difference from FIG. 2 in embodiment 1 is that the resonance suppression control block 9 performs control for correcting the d-axis current command value id* and the q-axis current command value iq* in addition to control for correcting the d-axis voltage command value vd* and the q-axis voltage command value vq*. Hereinafter, the different part will be mainly described.

There is a problem relevant to control response of the current control system having the d-axis current controller 10D and the q-axis current controller 10Q. From the perspective of the current control system, the voltage command corrected by the resonance suppression control is disturbance. If control response of the current control system is higher than the resonance frequency, operation is performed so as to cancel the voltage command corrected by the resonance suppression control, and as a result, the resonance suppression effect is not sufficiently obtained.

Figure 11:
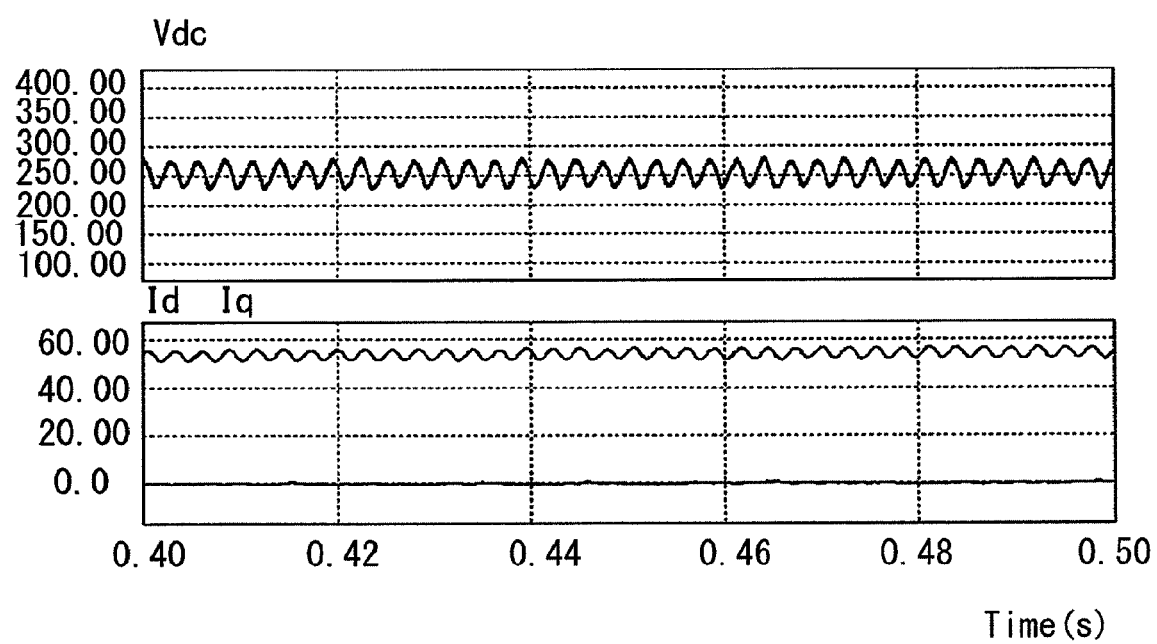
FIG. 11 is a diagram showing change of DC link voltage Vdc when the response speed of a current control system is changed.
Figure 12:
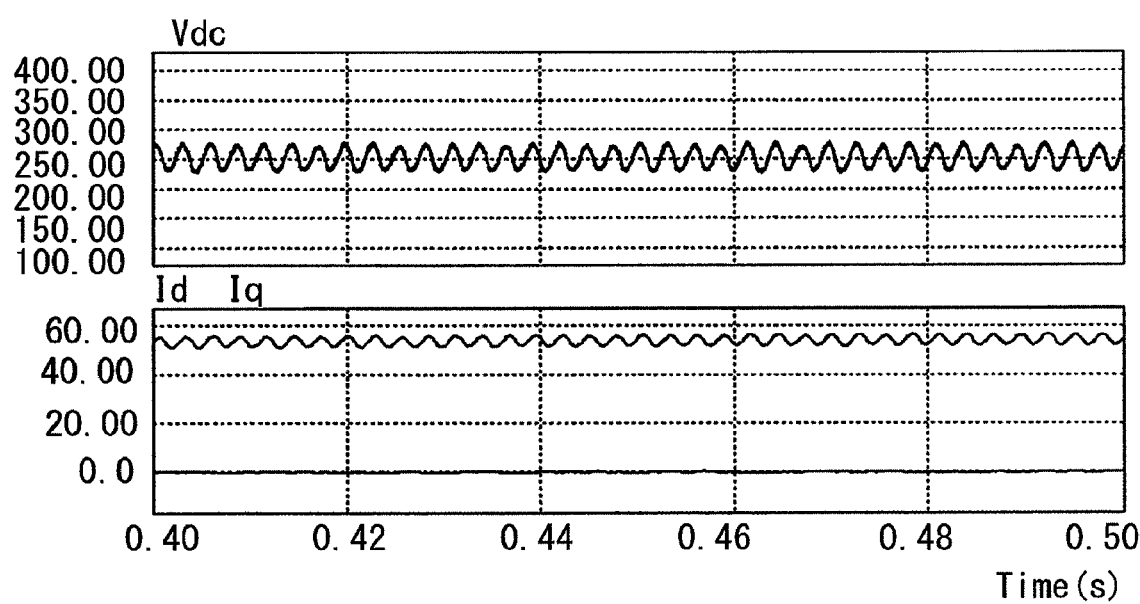
FIG. 12 is a diagram showing change of DC link voltage Vdc when the response speed of the current control system is changed.
Figure 13:
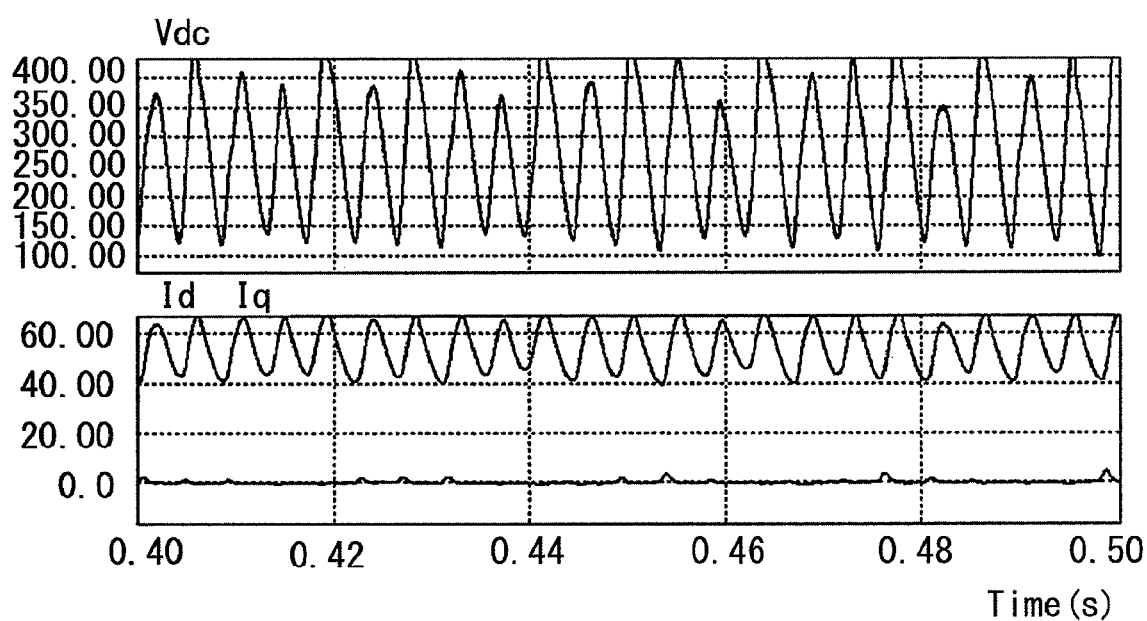
FIG. 13 is a diagram showing change of DC link voltage Vdc when the response speed of the current control system is changed.

FIGS. 11, 12, and 13 show waveforms of DC link voltage Vdc in the case where response of the current control system is increased in order of 100 Hz, 200 Hz, and then 300 Hz, respectively. That is, FIG. 11 shows the case where response of the current control system is 100 Hz, FIG. 12 shows the case where response of the current control system is 200 Hz, and FIG. 13 shows the case where response of the current control system is 300 Hz. In FIGS. 11 to 13, only the q-axis voltage is corrected.

It is found that, in the case where the response is 100 Hz and 200 Hz, DC link voltage Vdc can be suppressed, but in the case where the response is 300 Hz, DC link voltage Vdc greatly oscillates.

This is why, if the response of the current control system increases, the voltage correction operation (360 Hz) in the resonance suppression control is cancelled.

Accordingly, in the present embodiment 3, the change amount of current due to correction of the voltage command is calculated, and the change amount is added to the input stage of the current control system by a feedforward manner, whereby, substantially, the change amount of current due to correction of the voltage command is prevented from being fed back to the current control system.

Hereinafter, specific configuration and operation will be described with reference to FIG. 10. In the resonance suppression control block 9, a d-axis current compensation section 22 and a q-axis current compensation section 26 are added as compared to that in FIG. 2 in the above embodiment 1.

First, in the d-axis current compensation section 22, a phase delay section 23 delays the voltage signal of the resonance component voltage VdcAC from the multiplier 13 by a phase corresponding to 0.5 multiples of the control cycle.

As described in FIG. 2 above, regarding the voltage correction, the waste time due to the control cycle is 1.5 multiples of the control cycle, but since the current compensation performed in FIG. 10 further targets the current for which feedback based on the voltage is performed, the waste time in this case corresponds to twice the control cycle. In other words, here, it is necessary to perform the compensation operation for the current corresponding to the voltage signal before two control cycles, and therefore it is necessary to delay the voltage signal VdcAC by a phase corresponding to twice the control cycle.

However, since the phase advancing section 14 for advancing by a phase corresponding to 1.5 multiples of the control cycle is provided in the circuit for voltage correction in order to compensate for the waste time, as a result of deduction, the phase delay section 23 may make delay by a phase corresponding to 0.5 multiples of the control cycle as described above.

Therefore, in the case where the control cycle is set to such an extremely short time that the waste time is negligible and the phase advancing section 14 is omitted, the phase delay section 23 may make delay by a phase corresponding to twice the control cycle.

A multiplier 24 performs multiplication by the second gain K2 as in the multiplier 15. A motor model 25 is configured by a motor constant of the AC motor 3 which is a control target, and is calculated by expression (10).

[Mathematical 7]

$$\frac{1}{L_d s + R} \quad (10)$$

Here, R is a stator resistance component, and Ld is a d-axis inductance.

As in the d-axis current compensation section 22, the q-axis current compensation section 26 is also provided with: a phase delay section 23 for making delay by a phase corresponding to 0.5 multiples of the control cycle; a multiplier 27 for performing multiplication by the third gain K3 as in the multiplier 16; and a motor model 28 calculated by expression (11).

[Mathematical 8]

$$\frac{1}{L_q s + R} \quad (11)$$

Here, R is the stator resistance component, and Lq is a q-axis inductance.

A d-axis current correction signal idcmp* generated by the d-axis current compensation section 22 is added to the d-axis current command value id*, and the d-axis current controller 10D operates so that a deviation between the value obtained by the addition and the d-axis current detection value id becomes zero. In addition, a q-axis current correction signal iqcmp* generated by the q-axis current compensation section 26 is added to the q-axis current command value iq*, and the q-axis current controller 10Q operates so that a deviation between the value obtained by the addition and the q-axis current detection value iq becomes zero.

By the above configuration, a reliable resonance suppression effect is obtained in accordance with the degree of the response speed of the current control system, without interference between operation of current correction and operation of voltage correction.

As described above, in the power conversion device according to embodiment 3 of the present invention, the d-axis current compensation section 22 and the q-axis current compensation section 26 are newly provided. Thus, occurrence of overvoltage due to the LC resonance phenomenon can be reliably suppressed even in the case where the motor operation range is expanded and flux-weakening control is performed. In addition, even if response of the current control system is increased, a reliable resonance suppression effect can be obtained without interference between operation of current correction and operation of voltage correction.

Embodiment 4

Figure 14:
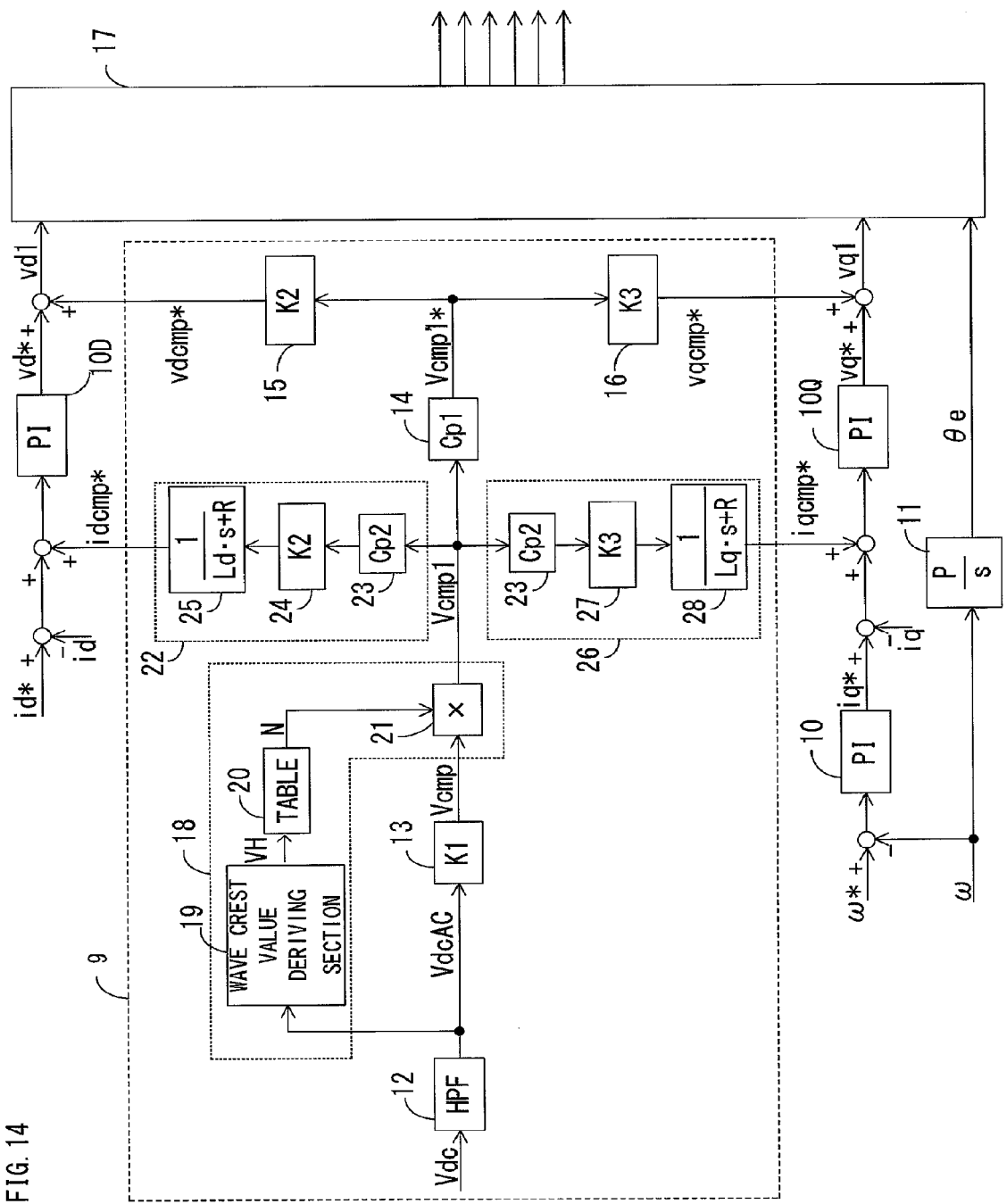
FIG. 14 is a diagram showing the internal configuration of a control unit 7 in a power conversion device according to embodiment 4 of the present invention.

FIG. 14 is a diagram showing the internal configuration of a control unit 7 in a power conversion device according to embodiment 4 of the present invention. In present embodiment, the resonance suppression control adjustment section 18 described in FIG. 5 in the above embodiment 2 is added to the resonance suppression control block 9 described in FIG. 10 in the above embodiment 3.

Since the configuration and operation of each section have been already described, the description thereof is not repeated. In the power conversion device according to the present embodiment 4, the d-axis current compensation section 22 and the q-axis current compensation section 26 are provided and further the resonance suppression control adjustment section 18 is provided. Thus, occurrence of overvoltage due to the LC resonance phenomenon can be reliably suppressed even in the case where the motor operation range is expanded and flux-weakening control is performed. In addition, even if response of the current control system is increased, a reliable resonance suppression effect can be obtained without interference between operation of current correction and operation of voltage correction. Further, increase in motor torque ripple can be minimized by reducing unnecessary resonance suppression control in the case of low load.

Embodiment 5

Figure 15:
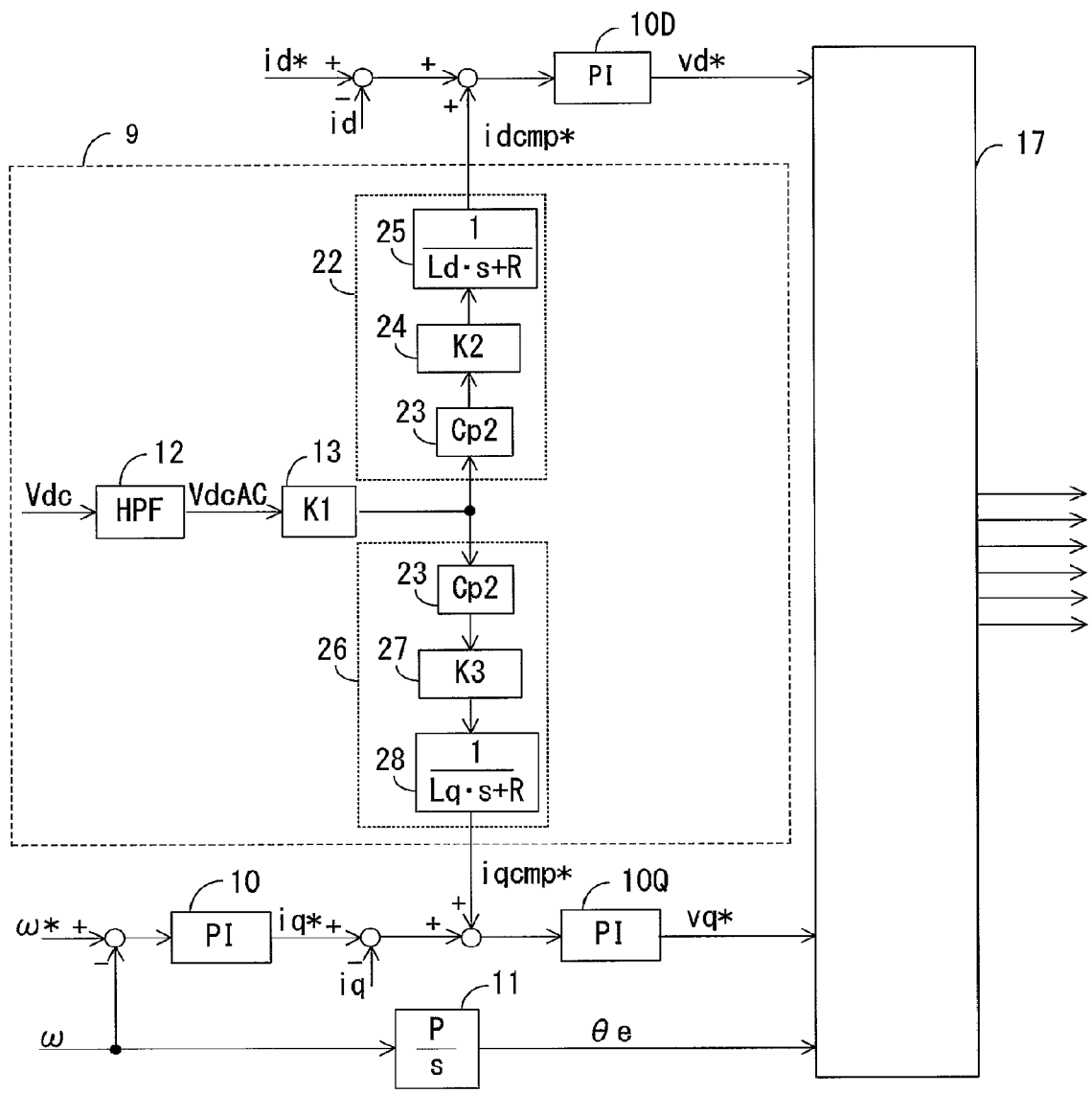
FIG. 15 is a diagram showing the internal configuration of a control unit 7 in a power conversion device according to embodiment 5 of the present invention.

FIG. 15 is a diagram showing the internal configuration of a control unit 7 in a power conversion device according to embodiment 5 of the present invention. A difference from FIG. 10 in the above embodiment 3 is that the control system for the voltage correction, i.e., the circuit for generating the d-axis voltage correction signal vdcmp* and the q-axis voltage correction signal vqcmp* is omitted in the resonance suppression control block 9.

Figure 16:
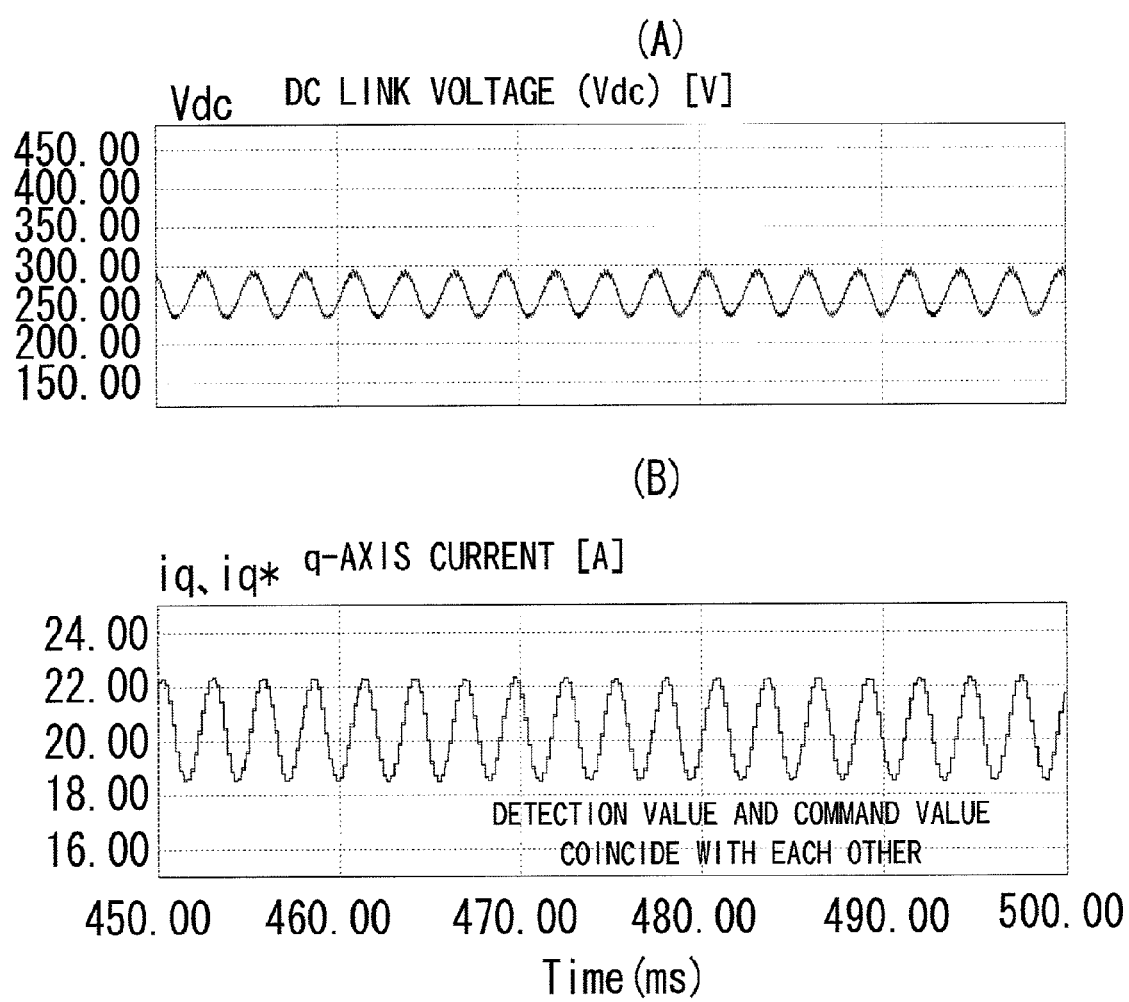
FIG. 16 is a diagram for explaining operation in the case where the response speed of a current control system is sufficiently high.

In FIG. 11 in the above embodiment 3, change in the DC link voltage Vdc when response of the current control system is changed has been described. On the other hand, the next FIG. 16 shows the characteristics in the case where the response speed of the current control system is further increased to a value sufficiently higher than the resonance frequency (in the example in the present application, 360 Hz), here, a value corresponding to 1000 Hz. FIG. 16(A) is a graph showing the relationship between time and Vdc, and FIG. 16(B) is a graph showing the relationship between time and q-axis current.

FIG. 16 shows only the case of q axis, since the response speed of the current control system, i.e., the q-axis current controller 10Q, is sufficiently high, the current detection value and the current command value coincide with each other (FIG. 16(B)), that is, the following expression is satisfied:

q-axis current detection value $iq$=q-axis current command value $iq*$+q-axis current correction signal $iqcmp*$.

That is, the q-axis current correction signal iqcmp* is reliably reflected in the q-axis current detection value iq, and thus, it is found that a sufficient resonance suppression effect is obtained without using the voltage correction. Indeed, it is found that the oscillation component of DC link voltage Vdc is also reduced to a small value.

On the basis of the above consideration result, in the present embodiment 5, the control system for the voltage correction is omitted as shown in FIG. 15, and thus there is an advantage that the configuration is simplified by the omission.

It is noted that omission of the control system for the voltage correction is equivalent to, for example, setting the gains K2 and K3 to zero in the multipliers 15 and 16 in FIG. 2. Therefore, it can be said that the invention according to the present embodiment 5 also belongs to the invention according to claim 1 of the present application.

Further, as described in embodiment 3, since the phase advancing section 14 is omitted, in the case where sampling of data and calculation thereof are performed with a predetermined control cycle, the d-axis current compensation section 22 and the q-axis current compensation section 26 are provided with the phase delay sections 23 for respectively delaying the d-axis current correction signal idcmp* and the q-axis current correction signal iqcmp* by a phase corresponding to twice the control cycle, in order to compensate for the waste time based on the control cycle.

As described above, in the power conversion device according to embodiment 5 of the present invention, under the condition in which the response speed of the current control system is sufficiently higher than a speed corresponding to the resonance frequency, the d-axis current compensation section 22 and the q-axis current compensation section 26 are provided, and the control system for the voltage correction is omitted. Thus, occurrence of overvoltage due to the LC resonance phenomenon can be reliably suppressed even in the case where the motor operation range is expanded and flux-weakening control is performed. In addition, since the control system for the voltage correction can be omitted, there is an advantage that the configuration is simplified by the omission.

Embodiment 6

Figure 17:
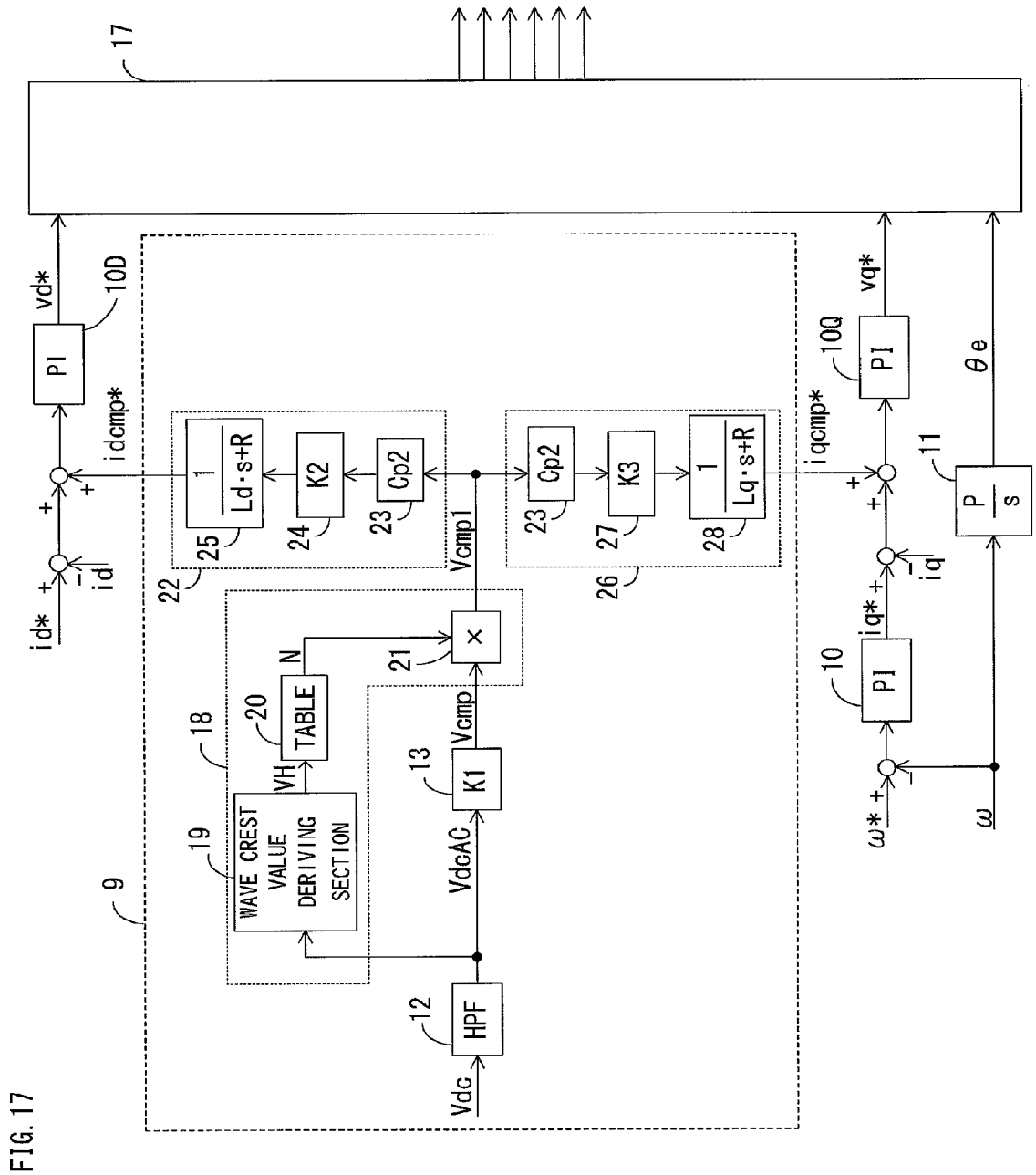
FIG. 17 is a diagram showing the internal configuration of a control unit 7 in a power conversion device according to embodiment 6 of the present invention.

FIG. 17 is a diagram showing the internal configuration of a control unit 7 in a power conversion device according to embodiment 6 of the present invention. In the present embodiment 6, the resonance suppression control adjustment section 18 described in FIG. 5 in the above embodiment 2 is added to the resonance suppression control block 9 described in FIG. 15 in the above embodiment 5.

Since the configuration and operation of each section have been already described, the description thereof is not repeated. In the power conversion device according to the present embodiment 6, under the condition in which the response speed of the current control system is sufficiently higher than a speed corresponding to the resonance frequency, the d-axis current compensation section 22 and the q-axis current compensation section 26 are provided, and further the resonance suppression control adjustment section 18 is provided, and the control system for the voltage correction is omitted. Thus, occurrence of overvoltage due to the LC resonance phenomenon can be reliably suppressed even in the case where the motor operation range is expanded and flux-weakening control is performed. In addition, since the control system for the voltage correction can be omitted, there is an advantage that the configuration is simplified by the omission. Further, increase in motor torque ripple can be minimized by reducing unnecessary resonance suppression control in the case of low load.

It is noted that, within the scope of the present invention, the above embodiments may be freely combined with each other, or each of the above embodiments may be modified or eliminated appropriately.

The invention claimed is:

1. A power conversion device comprising:
   a converter for converting AC voltage from an AC power supply to DC voltage and supplying the DC voltage to a capacitor;
   an inverter for converting the DC voltage of the capacitor to AC voltage and supplying the AC voltage to the AC load;
   as d-axis current controller for generating a d-axis voltage command value so that a deviation between a d-axis current command value and a d-axis current detection value on a d-q two-axis orthogonal coordinate system becomes zero;
   a q-axis current controller for generating a q-axis voltage command value so that a deviation between a q-axis current command value and a q-axis current detection value on the d-q two-axis orthogonal coordinate system becomes zero;
   a gate signal generation section for generating a gate signal for driving the inverter, on the basis of the d-axis voltage command value and the q-axis voltage command value,
   a voltage detection section for detecting voltage of the capacitor;
   a filter section for extracting an AC component of the voltage detected by the voltage detection section;
   a multiplier for multiplying output of the filter section by a first gain and outputting a result thereof;
   a d-axis voltage compensation section for multiplying output of the multiplier by a second gain and outputting a result thereof as a d-axis voltage correction signal; and
   a q-axis voltage compensation section for multiplying output of the multiplier by a third gain and outputting a result thereof as a q-axis voltage correction signal,
   the gate signal generation section generates the gate signal on the basis of a signal obtained by adding the d-axis voltage correction signal to the d-axis voltage command value and a signal obtained by adding the q-axis voltage correction signal to the q-axis voltage command value,
   in the case where sampling of data and calculation thereof are performed with a predetermined control cycle, the power conversion device further comprising a phase advancing section for advancing one of the d-axis voltage correction signal and the q-axis voltage correction signal by a phase corresponding to 1.5 multiples of the control cycle in order to compensate for a waste time based on the control cycle.

2. The power conversion device according to claim 1, wherein
   the second gain K2 and the third gain K3 are set by the following expressions:

$K2 = id/(\sqrt{(id^2 + iq^2)})$, and $K3 = iq/(\sqrt{(id^2 + iq^2)})$, where id is the d-axis current detection value and iq is the q-axis current detection value.

3. The power conversion device according to claim 1, further comprising a wave crest value deriving section for outputting a wave crest value of the AC component extracted by the filter section, wherein the first gain is changed in accordance with the wave crest value.

4. The power conversion device according to claim 1, wherein the AC load is an AC motor, the power conversion device further comprising:
   a speed controller for generating the q-axis current command value so that a deviation between a speed command value for the AC motor and a speed detection value thereof becomes zero; and
   an excitation controller for generating the d-axis current command value to set excitation current for the AC motor.

5. A power conversion device comprising:
   a converter for converting AC voltage from an AC power supply to DC voltage and supplying the DC voltage to a capacitor;
   an inverter for converting the DC voltage of the capacitor to AC voltage and supplying the AC voltage to the AC load;
   a d-axis current controller for generating a d-axis voltage command value;
   a q-axis current controller for generating a q-axis voltage command value;
   a gate signal generation section for generating a gate signal for driving the inverter, on the basis of the d-axis voltage command value and the q-axis voltage command value;
   a voltage detection section for detecting voltage of the capacitor;
   a filter section for extracting an AC component of the voltage detected by the voltage detection section;
   a multiplier for multiplying output of the filter section by a first gain and outputting a result thereof;
   d-axis voltage compensation section for multiplying output of the multiplier by a second gain and outputting a result thereof as a d-axis voltage correction signal; and
   q-axis voltage compensation section for multiplying output of the multiplier by a third gain and outputting a result thereof as a q-axis voltage correction signal,
   the gate signal generation section generates the gate signal on the basis of a signal obtained by adding the d-axis voltage correction signal to the d-axis voltage command value and a signal obtained by adding the q-axis voltage correction signal to the q-axis voltage command value,
   the power conversion device further comprising:
   a d-axis current compensation section for calculating a d-axis current component flowing due to voltage obtained by multiplying output of the multiplier by the second gain, and outputting the d-axis current component as a d-axis current correction signal; and
   q-axis current compensation section for calculating a q-axis current component flowing due to voltage obtained by multiplying output of the multiplier by the third gain, and outputting the q-axis current component as a q-axis current correction signal;
   the d-axis current controller generates the d-axis voltage command value so that a deviation between a d-axis current detection value and a value obtained by adding the d-axis current correction signal to a d-axis current command value on a d-q two-axis orthogonal coordinate system becomes zero, and
   the q-axis current controller generates the q-axis voltage command value so that a deviation between a q-axis current detection value and a value obtained by adding the q-axis current correction signal to a q-axis current command value on the d-q two-axis orthogonal coordinate system becomes zero,
   further in the case where sampling of data and calculation thereof are performed with a predetermined control cycle,
   the power conversion device comprising a phase advancing section for advancing each of the d-axis voltage correction signal and the q-axis voltage correction signal by a Phase corresponding to 1.5 multiples of the control cycle in order to compensate for a waste time based on the control cycle,
   the d-axis current compensation section and the q-axis current compensation section are provided with phase delay sections for respectively delaying the d-axis current correction signal and the q-axis current correction signal by a phase corresponding to 0.5 multiples of the control cycle.

6. The power conversion device according to claim 5, wherein
   the second gain K2 and the third gain K3 are set by the following expressions:

$K2=id/(\sqrt{(id^2+iq^2)})$, and $K3=iq/(\sqrt{(id^2+iq^2)})$, where id is the d-axis current detection value and iq is the q-axis current detection value.

7. The power conversion device according to claim 5, further comprising a wave crest value deriving section for outputting a wave crest value of the AC component extracted by the filter section, wherein
   the first gain is changed in accordance with the wave crest value.

8. The power conversion device according to claim 5, wherein the AC load is an AC motor, the power conversion device farther comprising:
   a speed controller for generating the q-axis current command value so that a deviation between a speed command value for the AC motor and a speed detection value thereof becomes zero; and
   an excitation controller for generating the d-axis current command value to set excitation current for the AC motor.

9. A power conversion device comprising:
   a converter for converting AC voltage from an AC power supply to DC voltage and supplying the DC voltage to a capacitor;
   an inverter for converting the DC voltage of the capacitor to AC voltage and supplying the AC voltage to the AC load;
   a d-axis current controller for generating a d-axis voltage command value;
   a q-axis current controller for generating a q-axis voltage command value;
   a gate signal generation section for generating a gate signal for driving the inverter, on the basis of the d-axis voltage command value and the q-axis voltage command value;
   a voltage detection section for detecting voltage of the capacitor;
   a filter section for extracting an AC component of the voltage detected by the voltage detection section;
   a multiplier for multiplying output of the filter section by a first gain and outputting a result thereof;
   a d-axis current compensation section for calculating a d-axis current component flowing due to voltage obtained by multiplying output of the multiplier by a second gain, and outputting the d-axis current component as a d-axis current correction signal; and q-axis current compensation section for calculating a q-axis current component flowing due to voltage obtained by multiplying output of the multiplier by a third gain, and outputting the q-axis current component as a q-axis current correction signal;

the d-axis current controller generates the d-axis voltage command value so that a deviation between a d-axis current detection value and a value obtained by adding the d-axis current correction signal to a d-axis current command value on a d-q two-axis orthogonal coordinate system becomes zero, and the q-axis current controller generates the q-axis voltage command value so that a deviation between a q-axis current detection value and a value obtained by adding the q-axis current correction signal to a q-axis current command value on the d-q two-axis orthogonal coordinate system becomes zero, the gate signal generation section generates the gate signal on the basis of the d-axis voltage command value and the q-axis voltage command value, Rather in the case where sampling of data and calculation thereof are performed with a predetermined control cycle, in order to compensate for a waste time based on the control cycle, the d-axis current compensation section and the q-axis current compensation section respectively include phase delay sections for delaying the d-axis current correction signal and the q-axis current correction signal by a phase corresponding to twice the control cycle.

10. The power conversion device according to claim 9, wherein the second gain K2 and the third gain K3 are set by the following expressions:

$$K2 = id/(\sqrt{(id^2 + iq^2)}),\text{ and}$$

$$K3 = iq/(\sqrt{(id^2 + iq^2)}),$$

where id is the d-axis current detection value and iq is the q-axis current detection value.

11. The power conversion device according to claim 9, further comprising a wave crest value deriving section for outputting a wave crest value of the AC component extracted by the filter section, wherein the first gain is changed in accordance with the wave crest value.

12. The power conversion device according to claim 9, wherein the AC load is an AC motor, the power conversion device further comprising:

a speed controller for generating the q-axis current command value so that a deviation between a speed command value for the AC motor and a speed detection value thereof becomes zero; and an excitation controller for generating the d-axis current command value to set excitation current for the AC motor.

* * * * *